United States Patent
Cho

(10) Patent No.: US 7,703,129 B2
(45) Date of Patent: Apr. 20, 2010

(54) AUTHENTICATION SYSTEM AND METHOD THEREOF FOR DIAL-UP NETWORKING CONNECTION VIA TERMINAL

(75) Inventor: Young-Beack Cho, Seoul (KR)

(73) Assignee: LG Electronics, Inc., Seoul (KR)

( * ) Notice: Subject to any disclaimer, the term of this patent is extended or adjusted under 35 U.S.C. 154(b) by 1244 days.

(21) Appl. No.: 11/212,804

(22) Filed: Aug. 25, 2005

(65) Prior Publication Data

US 2006/0053484 A1 Mar. 9, 2006

(30) Foreign Application Priority Data

Aug. 28, 2004 (KR) ............... 10-2004-0068280

(51) Int. Cl.
H04L 29/06 (2006.01)
(52) U.S. Cl. .................. 726/7; 726/6; 726/14
(58) Field of Classification Search .......... 726/2, 726/3, 5, 7
See application file for complete search history.

(56) References Cited

U.S. PATENT DOCUMENTS

| | | | |
|---|---|---|---|
| 7,082,535 B1 * | 7/2006 | Norman et al. ............. 713/163 |
| 7,269,659 B2 * | 9/2007 | Kadyk et al. .............. 709/229 |
| 7,487,539 B2 * | 2/2009 | Ramachandran et al. ...... 726/10 |
| 2003/0039237 A1 | 2/2003 | Forslow | |
| 2004/0090930 A1 * | 5/2004 | Lee et al. .................. 370/328 |
| 2008/0028081 A1 * | 1/2008 | Bruss ..................... 709/228 |

FOREIGN PATENT DOCUMENTS

| | | |
|---|---|---|
| EP | 0 636 963 A | 2/1995 |
| JP | 2004164576 | 6/2004 |
| KR | 1020000039532 A | 7/2000 |
| KR | 10020030093605 A | 12/2003 |

* cited by examiner

*Primary Examiner*—Minh Dinh
(74) *Attorney, Agent, or Firm*—Lee, Hong, Degerman, Kang & Waimey

(57) ABSTRACT

Disclosed are an authentication system and method thereof for a dial-up networking connection via a terminal. The authentication system includes a terminal for snooping an authentication request packet that includes an authentication ID and password of a computer requesting authentication, and for generating an acknowledge packet of the authentication request packet. The authentication method includes receiving an authentication request packet including an authentication ID and password by a terminal, generating an acknowledge packet by the terminal, and transmitting generated acknowledge packet from the terminal to the computer.

6 Claims, 3 Drawing Sheets

AUTHENTICATION SYSTEM AND METHOD THEREOF FOR DIAL-UP NETWORKING CONNECTION VIA TERMINAL

CROSS-REFERENCE TO RELATED APPLICATIONS

Pursuant to 35 U.S.C. §119(a), this application claims the benefit of earlier filing date and right of priority to Korean Application No. 10-2004-68280, filed on Aug. 28, 2004, the contents of which are hereby incorporated by reference herein in its entirety.

FIELD OF THE INVENTION

The present invention relates to a dial-up networking connection via a terminal, and particularly, to an authentication system and method thereof for a dial-up networking connection via a terminal.

BACKGROUND OF THE INVENTION

FIG. 1 illustrates an authentication processing procedure for a dial-up networking connection via a terminal in accordance with the conventional art.

Conventionally, to use a dial-up networking connection service, an authentication module in computer 1 transmits an authentication request packet (PAP_Authenticate_Request) to a mobile communications terminal 2, which then retransmits the authentication request packet to an authentication authorization accounting (AAA) server on the network 3. The AAA server responds to the authentication request packet by transmitting an acknowledge packet (PAP_Authentication-_ACK) back to the mobile communications terminal 2, which in turn forwards the acknowledge packet to the computer 1. After receiving the acknowledge packet, the computer 1 executes IP Control Protocol (IPCP) negotiation, and thereby begins communication with the network 3.

The mobile communications terminal 2 performs no processing regarding the authentication request packet other than to forward the request to the AAA server. Also, the mobile communications terminal 2 performs no processing on the acknowledge packet other than to forward the acknowledge packet to the computer 1.

However, the conventional authentication method for the dial-up networking connection via the terminal has the following problem. After requesting authentication from the AAA server via the terminal 2, the computer 1 must receive an acknowledge packet from the AAA server responsive to an authentication request packet before performing the next step. Thus, the computer 1 does not perform any operation from the time an authentication request is sent until an authentication acknowledgement is received. This time includes the Round Trip Time (RTT) over the unassured mode (UM) interface for the request and acknowledgement. Here, the RTT refers to the time period beginning from when authentication information (e.g., authentication ID, authentication password, etc. for an authentication request of a computer) is transmitted to the network up to the time when a response packet with respect to the authentication request is received. A need therefore exists for a system and a method to reduce the total time required to authenticate a dial-up networking connection via a terminal.

SUMMARY OF THE INVENTION

Therefore, an object of the present invention is to provide an authentication system and method thereof for a dial-up networking connection via a terminal, whereby, the RRT duration over the UM interface is replaced with the RTT duration over the RM interface, such that the authentication time duration when the computer uses the dial-up network service can be reduced.

To achieve this and other advantages and in accordance with the purpose of the present invention, as embodied and broadly described herein, an authentication system and method for a dial-up networking connection via a communications terminal is provided comprising: a computer requesting authentication by transmitting an authentication request packet including an authentication ID and authentication password; a terminal monitoring and storing (hereinafter referred to as snooping) the transmitted authentication request packet, forwarding the authentication request packet, and generating an acknowledge packet responsive to the authentication request packet; and a network generating a response packet with respect to the forwarded authentication request packet.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

DETAILED DESCRIPTION OF THE INVENTION

Reference will now be made in detail to the preferred embodiments of the present invention, examples of which are illustrated in the accompanying drawings.

One embodiment of an authentication system and method thereof for a dial-up networking connection via a terminal will now be described in detail with reference to FIGS. 2 and 3, whereby the RTT duration over the UM interface is replaced with the RTT duration over the RM interface in an authentication processing procedure used by a computer for a dial-up networking connection service, such that the authentication time duration when the computer uses a dial-up networking connection service is reduced.

Figure 1:
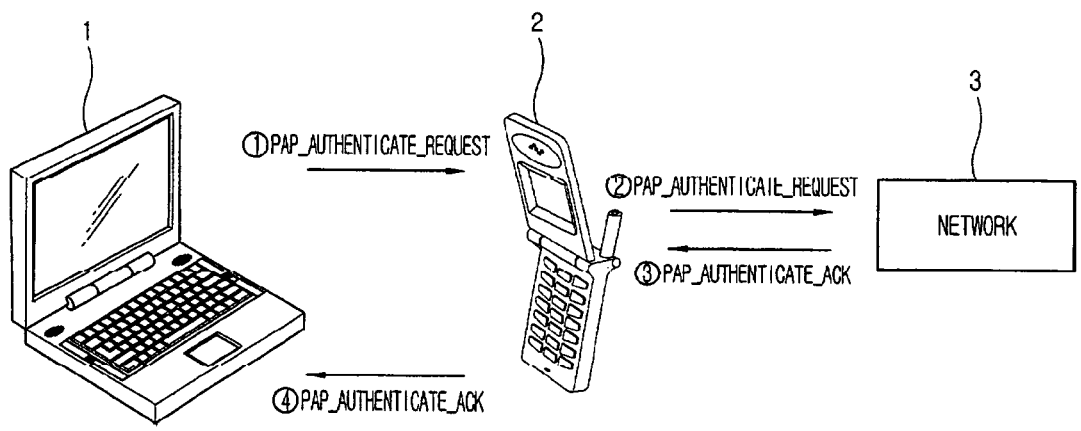
FIG. 1 illustrates an authentication processing procedure for a dial-up networking connection via a terminal in accordance with the conventional art.
Figure 2:
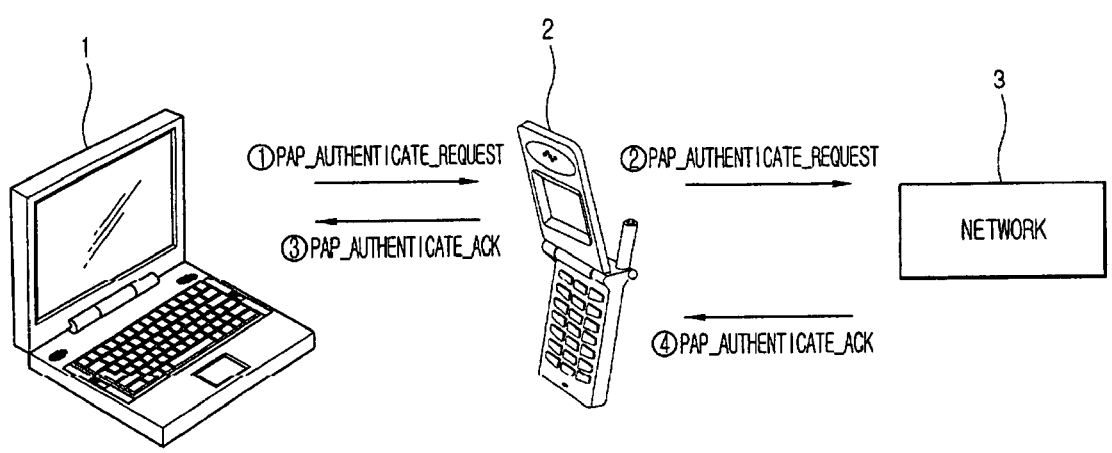
FIG. 2 illustrates an authentication processing procedure for a dial-up networking connection via a terminal in accordance with the present invention.

FIG. 2 illustrates an authentication processing procedure for a dial-up networking connection via a terminal in accordance with the present invention. As shown, an authentication system for a dial-up networking connection via a terminal in accordance with the present invention includes a computer 1 requesting authentication, a terminal 2 snooping an authentication request packet including an authentication ID and password for computer 1, which requests the authentication from the network 3 and generates an acknowledge packet with respect to the authentication request packet, and a network receiving the authentication request packet from the terminal 2 and transmitting an acknowledge packet with respect to the received authentication request packet to the terminal 2.

Figure 3:
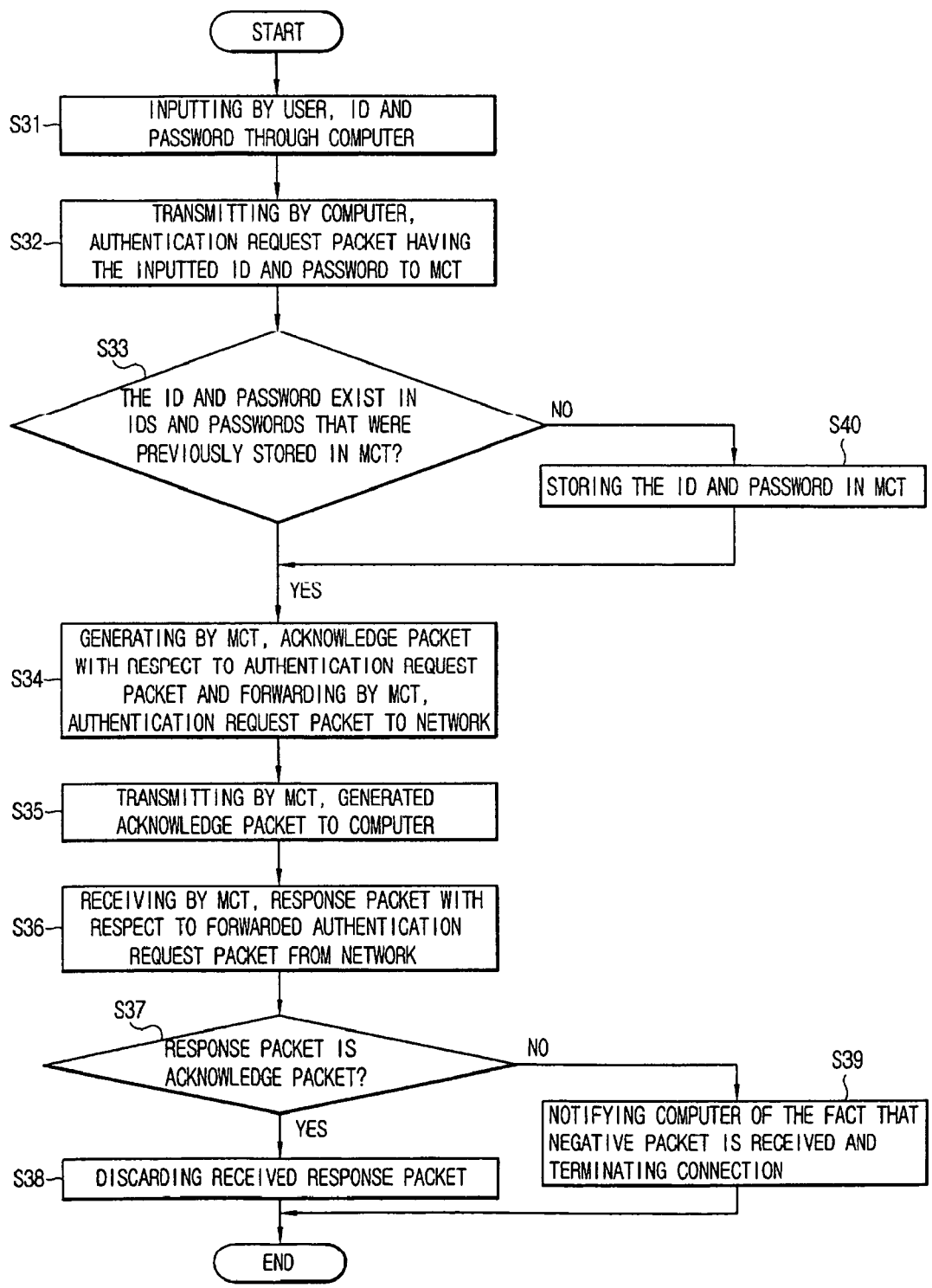
FIG. 3 is a flow chart illustrating an authentication method for a dial-up networking connection via the terminal in accordance with the present invention.

FIG. 3 describes the operation of the authentication system for the dial-up networking connection via the terminal in accordance with the present invention in detail. The authentication method for the dial-up networking connection via the terminal in accordance with the present invention includes:

inputting an authentication ID and authentication password through a computer (S31);

transmitting by the computer, an authentication request packet having the inputted authentication ID and authentication password to a terminal (S32);

if the authentication ID and password transmitted to the terminal already exist in the previously authenticated IDs and passwords that were previously stored within the terminal (S33), then generating by the terminal, an acknowledge packet with respect to the authentication request packet and forwarding by the terminal, the authentication request packet to a network (S34), else storing the authentication ID and password in the terminal (S40);

transmitting by the terminal, the generated acknowledge packet to the computer (S35);

receiving by the terminal, a response packet with respect to the forwarded authentication request packet from the network (S36);

discarding the received response packet when the received response packet is an acknowledge packet (S38); and notifying the computer and terminating a call request of the computer when the received response packet is a negative acknowledge packet (S39).

The authentication method for the dial-up networking connection via the terminal in accordance with the present invention will now be described in detail. The description will be made on the assumption that the terminal in accordance with the present invention is a mobile communication terminal (MCT).

To connect with a network using a dial-up networking connection service, a user inputs an authentication ID and password to a computer 1 and initiates a transmission to a dial-up networking connection service (S31). The computer 1 transmits an AT command to the MCT 2 in order to send a call request. The MCT 2, having received the AT command, transits a Radio Link Protocol (RLP) from an initial NULL state to an Establish state, receives a traffic channel and reports to the computer 1. The computer 1 having received such report initiates a Point to Point Protocol (PPP) setup procedure, and an authentication module of the computer 1 transmits an authentication request packet having the authentication ID and password inputted by the user (S32) to the MCT 2.

After receiving the authentication request packet, The MCT 2 determines whether the authentication ID and password already exist in authentication information previously authorized and stored in the MCT (S33). The stored authentication information is stored in a nonvolatile memory (e.g., ROM). If the authentication ID and password were previously authenticated and stored, the MCT 2 generates an acknowledge packet responsive to the authentication request packet and forwards the authentication request packet to the network 3 (S34). However, if the authentication ID and password were not previously authenticated, the MCT 2 stores the authentication ID and password by updating the nonvolatile memory with the authentication ID and password. As in the related art, the computer 1 performs the authentication step upon receiving a response packet transmitted from the network (S40).

After generating the acknowledge packet, the MCT 2 transmits the acknowledge packet to the computer 1 (S35). Having received the acknowledge packet, the computer 1 initiates an IPCP negotiation step for the dial-up networking connection without waiting for an acknowledge packet transmitted from the network 3.

The network 3 generates a response packet responsive to the authentication request packet and transmits the generated response packet to the MCT 2(S36). The MCT 2, having received the response packet, determines whether the response packet is an acknowledge packet (S37). If the received response packet is an acknowledge packet, the MCT 2 simply discards the received response packet because the authentication processing procedure of the computer 1 has already been completed. However, if the received response packet is a negative acknowledge packet (PAP_Authenticate_NACK), the MCT 2 notifies the computer 1 and terminates the call.

Therefore, in accordance with the present invention, the RTT duration is reduced because the computer 1 receives an acknowledge packet directly from the MCT 2 on the RM interface rather than indirectly from the network 3 on the UM interface, and the time to complete the authentication process is thereby reduced by 90% or more. The RRT duration over the UM interface is replaced with the RRT duration over the RM interface, such that the authentication time duration when the computer uses the dial-up networking connection service can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An authentication system for a dial-up networking connection via a terminal, the system comprising:

a computer for providing an authentication request, wherein the authentication request comprises an authentication ID and a password, and for communication with a network; and a terminal for receiving the authentication request, for generating a first acknowledgment responsive to the authentication request, for transmitting the first acknowledgment to the computer, for forwarding to the network the authentication request, without an authentication ID and a password from a list of previously stored authentication IDs and passwords, upon determining that the authentication ID and the password of the received authentication request exist in the list of previously stored authentication IDs and passwords, and for receiving from the network a second acknowledgment responsive to the forwarded authentication request, wherein the terminal is configured for discarding the second acknowledgement received from the network when the second acknowledgement is positive, and for notifying the computer that authorization is denied when the second acknowledgement is negative.

2. The system of claim 1, wherein the terminal comprises a nonvolatile memory, wherein the nonvolatile memory stores the list of previously authenticated IDs and passwords.

3. The system of claim 1, wherein the terminal compares the received authentication request with the list of previously stored authentication IDs and passwords.

4. The system of claim 3, wherein the terminal adds the authentication ID and password to the list of previously stored authentication IDs and passwords when the authentication ID and password are not contained in the list of previously stored authentication IDs and passwords.

5. An authentication method for a dial-up networking connection via a terminal, the method comprising:

receiving by a terminal, an authentication request including an authentication ID and password from a computer that requests the authentication;

determining by the terminal, whether the authentication ID and the password of the received authentication request exist in a list of previously stored authentication IDs and passwords;

generating by the terminal, a first acknowledgment responsive to the received authentication request;

transmitting by the terminal, the generated first acknowledgment to the computer;

forwarding by the terminal, to the network, the authentication request, without an authentication ID and a password from the list of previously stored authentication IDs and passwords, if it is determined that the authentication ID and the password of the received authentication request exist in the list of previously stored authentication IDs and passwords;

receiving from the network a second acknowledgment responsive to the forwarded authentication request;

discarding by the terminal, the received second acknowledgement received from the network when the second acknowledgement is positive; and notifying by the terminal, the computer that authorization is denied when the second acknowledgement is negative.

6. The method of claim 5, further comprising storing by the terminal, the authentication ID and password of the received authentication request packet in a nonvolatile memory if it is determined that the authentication ID and password of the received authentication request packet do not exist in the list of previously authenticated IDs and passwords.

* * * * *